United States Patent [19]

Kelmar

[11] Patent Number: 4,820,313

[45] Date of Patent: Apr. 11, 1989

[54] COAL PROCESSING METHOD AND APPARATUS

[75] Inventor: John J. Kelmar, McKeesport, Pa.

[73] Assignee: Kelmar Energy Corporation, McKeesport, Pa.

[21] Appl. No.: 908,270

[22] Filed: Sep. 17, 1986

[51] Int. Cl.$^4$ ................................................. C10L 5/00
[52] U.S. Cl. ........................................ 44/622; 44/627; 44/629
[58] Field of Search ................. 44/1 R, 1 S R, 2, 622, 44/627, 629; 241/1, 2, 12, 15, 18, 25

[56] References Cited

U.S. PATENT DOCUMENTS

| | | | |
|---|---|---|---|
| 1,734,992 | 11/1929 | Barrows | 241/18 |
| 2,560,807 | 7/1951 | Lobo | 241/1 |
| 2,669,509 | 2/1954 | Sellers | 241/1 |
| 2,803,587 | 8/1957 | Jung | 241/23 |
| 3,352,498 | 11/1967 | Schulte | 241/1 |
| 3,545,683 | 12/1970 | Schulte | 241/1 |
| 3,854,896 | 12/1974 | Switzer et al. | 241/23 |
| 4,120,664 | 10/1978 | Gleim | 44/1 S R |
| 4,146,366 | 3/1979 | Keller | 44/1 R |
| 4,158,548 | 6/1979 | Burk, Jr. et al. | 44/1 S R |
| 4,364,740 | 12/1982 | Massey et al. | 44/1 S R |

*Primary Examiner*—Carl F. Dees
*Attorney, Agent, or Firm*—Birch, Stewart, Kolasch & Birch

[57] ABSTRACT

An ecologically safe, mechanical, single stage process that employs low pressure induced fracturing of the carbon matrix of coal to desulphurize and reduce lump coal to uniform micron particle size, allowing minerals to be simply, mechanically separated from the coal.

25 Claims, 1 Drawing Sheet

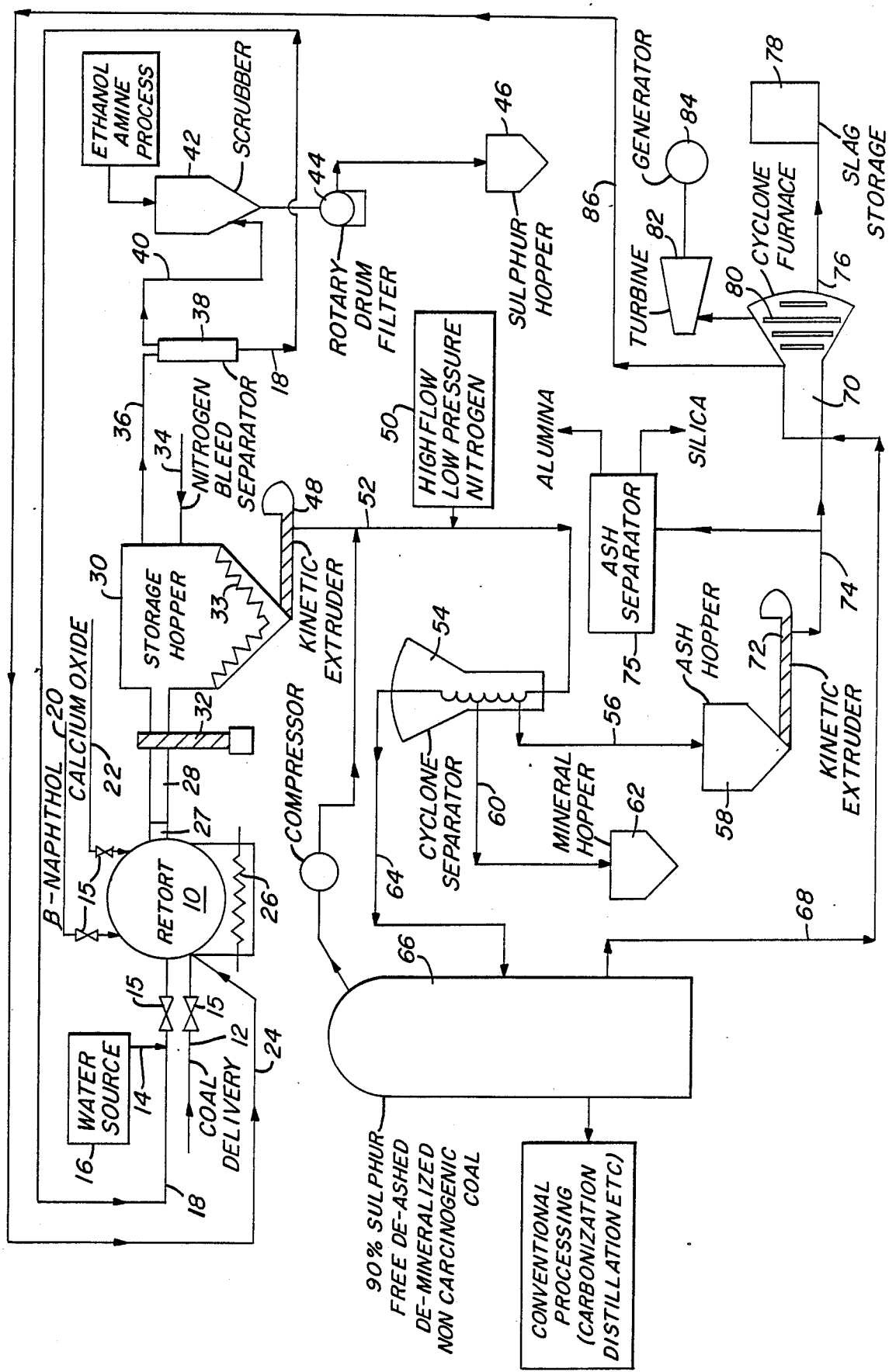

COAL PROCESSING METHOD AND APPARATUS

BACKGROUND OF THE INVENTION

It is well known that coal is one of our most abundant and versatile hydrocarbon resources. From raw coal, the practitioners of the art are able to process coke, tar, and gas, and from these literally hundreds of commercially useful products have been developed including but certainly not limited to solvents, motor fuels, varnish and other surface coatings, paving, asphalt, roofing material and the like, waterproofing materials, laxatives, disinfectants, medicines, food preservatives, dyes and perfumes, explosives, fertilizers, rubber goods, sizing, tobacco seasoning, photographic processing chemicals, and many, many more.

Of course, the commercial viability of such coal products depends entirely upon the economy of the processes applied, as compared to the available alternatives. Practitioners of the art have continually sought more economical processing methods for processing of raw coal in an effort to enhance the profit margins of the industry and reduce consumer costs. The natural effect of such efforts, where they have succeeded, has been to increase end product demand, reduce the cost of entry into the industry, and thereby foster an environment of healthy competition.

Practitioners of the art have also continually sought to solve other problems which have been heretofore inherent in coal processing. For example, economical processing of the sulphur content of coal has been sought to eliminate acid rain and other ecologically undesirable consequences which result from the use of sulphur bearing coal in coal fired equipment. Processing of petroleum solvents or by-products thereof in coal also has received considerable attention as the cost of providing employees with special protective clothing and equipment, plus the cost of disposal of contaminated solvents, has been a significant burden on the cost effectiveness of coal processing.

Still further, practitioners of the art have sought, largely without success, cost effective ways for recovering minerals such as vanadium, nickel, cobalt and titanium from coal for marketing thereof. They have also sought ways and means of coal processing that could eliminate the large and dirty crushing and grinding facilities, large mix tanks and expensive pumps, which contribute to high capital costs, degradation of the workplace environment, and high maintenance costs in the industry. They have likewise sought to economically process coal to provide a cleaner, higher quality product than the raw coal as it comes from the mine.

BRIEF SUMMARY OF THE INVENTION

The present invention provides a novel and improved method and apparatus for processing of coal in a manner that produces de-ashed, de-mineralized, low organic sulphur and non-carcinogenic coal in a small particle size (generally about 4 microns) for processing by carbonization, distillation, and other known processes to produce end products or interim process products of superior quality. The invention contemplates separation of sulphur, minerals, and gas from the coal in conjunction with reduction of the coal particle sizes from rather large lumps 2 to 6 inches or larger in size, to the micron size ranges mentioned above without resorting to conventional grinding, and without need of the expensive mix tanks and pumps conventionally used. More specifically, the invention is based on a pressure process which is effective to fracture the carbon matrix of raw lump coal by means of a sufficient pressure differential between elevated pressure established within the carbon matrix and the ambient pressure outside of the coal lump.

I have developed this process and the apparatus therefor in conjunction with my recognition that at a temperature between, for example, approximately 300° C. and 500° C. raw coal will become soft or plastic and will expand to create a lattice structure in which interconnected interstices are distributed throughout the carbon matrix. The lattice structure exists only in the cited temperature range. Above approximately 500° C. the lattice structure is destroyed. By heating the coal to the specified temperature range, an opportunity is created to internally pressurize lumps of coal through the network of interconnected interstices. Subsequent rapid reduction of the external pressure creates a pressure differential between the high internal and lower external pressure. With a sufficient pressure differential, the resulting forces on the carbon matrix exceed its strength and cause the carbon matrix to fracture. This eliminates the need for heavy duty grinding equipment conventionally required to pulverize the coal and greatly simplifies and economizes mineral and gas recovery, as well as cleaning of the coal for subsequent processing or end use.

The method and apparatus of the invention will be more fully understood upon consideration of the following detailed description, with reference to the accompanying drawing, in which the sole figure is a schematic diagram illustrating the coal processing apparatus and method of this invention.

As shown in the figure, coal input, which may be unsorted and undried coal particles in a size range from approximately 200 mesh to approximately 6 inches, is placed in a high pressure retort 10 via a suitable delivery means such as a conduit 12. Also delivered to the retort via a delivery conduit 14 is a sufficient quantity of a pressure generating medium such as water to constitute 20% to 60% by weight of the water and coal batch in retort 10. The preferred ratio of water to coal is a 1:1 mixture by weight. Water line 14 is fed by a fresh water source 16 and by recirculating water from a recirculation line 18, as described hereinbelow. Dry ice may be substituted for some or all of the water input, and other liquid media substitutions are also contemplated, although water is the preferred choice overall.

Into the water and coal mixture in retort 10 there may be added up to approximately 4% by weight of B-naphthol (Beta) to reduce oxidation already present in the raw coal, as shown by delivery line 20, and up to approximately 5% calcium oxide by weight to enhance the de-sulphurization of the coal, as shown by delivery line 22. The calcium oxide acts as a scavenging agent to remove residual sulphur that is not released from the carbon matrix upon fracturing of the coal in retort 10, as below described. I have found that these two additives, although useful in some cases depending on the quality of the coal, are not necessary for processing of about 80% of the coals I have tested heretofore. Alternative oxidation inhibiting agents which may be used include Fluorene and Iodobenzene. Alternative desulphurizing agents include Potassium Hydroxide and Sodium Hydroxide.

The contents of retort 10, as above described, are isolated from the ambient environment by, among other expedients, suitable high pressure valving means 15 or the like associated with each conduit which penetrates into the interior of retort 10. The contents of retort 10 then are brought to a temperature in the range of approximately 300° C. to approximately 500° C. by any suitable means such as steam heating with steam supplied via a conduit 24 or electric heating provided by a heating element 26. As the contained coal is softened by the described heating, the coal particles expand to create in each particle the lattice structure and network of interconnected interstices as above described. The elevated temperature, in the presence of the water or dry ice, also creates sufficient pressure within the sealed retort 10 to penetrate the interstices of the coal lattice structure to thereby pressurize each coal particle or lump internally. The gas pressure may be in the range of 1000 to 5000 psi, for example, depending upon the type of coal and the amount of oxidation therein as predetermined in batch, bench scale testing prior to system startup. The small amounts of dissolved chemical compounds of calcium oxide and the B-naphthol, when used, also enter the coal lattice matrix under high pressure. The predominant by-product minerals, including nickel, cobalt, titanium, and vanadium, as well as the gases in the coal lumps, are unaffected by temperatures in the range to which the coal is being subjected or by the high pressure steam.

An outlet port 27 of retort 10 is connected to an outlet conduit 28 which extends from retort 10 to a storage hopper 30 and includes a quick opening pressure containment means such as a large diameter air operated valve or rupture plate 32 which may be operated to allow rapid decompression of retort 10 to storage hopper 30. This causes the lattice in the coal lumps, which is supported only by the carbon matrix, to fracture under the loads imposed by the gas pressure differential between the retort and interior regions of the coal lumps. This releases the minerals and gases that were formerly captured in the carbon matrix. After lattice fracture, most of the carbon particles will be an average of approximately 4 microns in size, the mineral particles a calculated 6 microns, and the ash particles approximately 8 microns. The large pressure differential between retort 10 and storage hopper 30 during retort decompression creates strong flow currents through delivery conduit 28 which convey substantially all of the retort contents into storage hopper 30. The temperature in delivery line 28 will be reduced from the coal processing temperature range above specified to about 150° C. as a result of the energy spent in the rapid decompression process. Pressure in the system after decompression is regulated to about 50 psi by any suitable means, for example by judicious selection of the volume of storage hopper 30.

After the decompression process as described, the coal, minerals and ash will be about 80% under 25 micron size particles in storage hopper 30 and the hopper is maintained at a temperature of at least 120° C. as by electric heating elements 33 in hopper 30 to keep the sulphur, methane and ammonia suspsended in the steam and thus prevent them from settling back onto the coal particle mass.

A nitrogen bleed line 34 is provided, regulated suitably to a pressure of 5 psi for example, to provide nitrogen flow into storage hopper 30 only when hopper pressure falls below 5 psi. The only path for escape of gas (mostly steam) from the storage hopper is via a conduit 36 which routes the gas to a gas separator 38 where water is removed from the gas and delivered via recirculation line 18 for recycling to retort 10. This water may thus be combined with water from fresh water source 16 for use in processing the next batch of coal. From gas separator 38, the gas is delivered via a conduit 40 to an ethanol amine empty column counter flow scrubber 42 where sulphur is removed from the gas and collected by a rotary drum filter 44. From filter 44 the sulphur may be delivered to a sulphur storage hopper 46 and collected therein for ultimate resale. The 120° C. temperature level in storage hopper 30 is sufficient to keep sulphur suspended in the steam. Therefore, the passage of gas from hopper 30 via line 40 to gas separator 42 removes most of the organic sulphur (i.e. the sulphur content from the unprocessed raw coal) from hopper 30 for processing and ultimate delivery to sulphur hopper 46 as above described. Accordingly, the coal remaining in storage hopper 30 is about 90% organic sulphur-free.

This sulphur-free coal powder is removed from storage hopper 30 by a suitable system, for example, an MPG International Inc. Kinetic Extruder high pressure power feeder 48 equipped with a 1.14 meter rotor running at a speed of 3,070 RPM. This equipment will deliver 50 tons of coal per hour from storage hopper 30 for further processing.

The described delivery system (i.e. power feeder 48) utilizes a high flow, low pressure gas system with gas supplied by any suitable gas source as schematically illustrated at 50 and comprising, for example, a high pressure tube system or other suitable storage facility. The gas injected into the system by apparatus 50 downstream of power feeder 48 is recirculated in the system as hereinbelow described. Under the impetus provided by power feeder 48 and the high flow, low pressure gas, the de-sulphurized coal is propelled via conduit 52 to a cyclone separator 54 where first the ash, being the heaviest component, is removed. The ash separated from the coal is delivered via a conduit 56 or other conveying means to an ash storage hopper 58.

Further processing of the coal in cyclone separator 54 removes the minerals, for example, nickel, cobalt, titanium and vanadium, from the coal for delivery thereof via a conduit 60 to a mineral hopper 62. Additionally, and in conjunction with operation of cyclone separator 54 and/or delivery of the minerals to mineral hopper 62, the minerals may be separated and categorized by any suitable means, for example by gas chromatography as performed by the Dupont SF-3 Particle Analyzer or a unit of similar design. The coal output from cyclone separator 54 is conveyed via a conduit 64 or other suitable conveying means to a coal storage hopper 66 to await further processing or combustion thereof. For example, the coal may be delivered directly to a furnace for burning thereof as fuel, or to a processing plant for carbonization, distillation or other processing of the coal. Of course, the coal hopper may be simply a temporary storage facility from which coal is dispensed for shipment to fuel customers or coal processors.

Some of the coal contained in hopper 66 may be delivered via a conduit 68 or other delivery means to a cyclone furnace 70 where it is combined with ash delivered from the ash hopper 58 by means of a power feeder 72 (similar in many respects to power feeder 48) and a suitable conduit means 74 for combustion and conversion of the ash to molten slag. The slag is then delivered via a conduit 76 or other suitable conveying means to a slag storage hopper 78, from which it may be dispensed and marketed for such uses as construction projects. The special processed ash in hopper 58, which has some of its minerals removed as discussed hereinabove, may also be subject to additional mechanical treatment for separating the silica and alumina from the remainder of the ash, as shown at 75.

The boiler section 80 of cyclone furnace 70 generates steam to drive a steam turbine 82, which in turn drives any suitable machine, for example an electric power generator 84. Additional steam from boiler 80 may be recycled via a conduit 86 into conduit 24 to supply some or all of the steam for heating retort 10 in conjunction with or in lieu of electrical heating thereof by heating elements 26.

Of course it will be understood that the processing steps described hereinabove with reference to the novel apparatus also constitute disclosure of the novel method of this invention.

According to the description hereinabove, I have invented a novel and improved coal processing method and apparatus which produces substantially organic sulphur-free, de-ashed, de-mineralized, noncarcinogenic coal in a small and uniform particle size for use as fuel, or as input for further conventional coal processing. The invention provides this coal product in conjunction with economical separation of ash and minerals, including sulphur, from the coal whereby the ash and minerals are also economically available for further processing or marketing. The finely divided coal output of my process and apparatus is a superior coal product. For example, heating and carbonizing this coal product in my electrically heated coke oven, as described in U.S. Pat. No. 4,249,996, will produce improved quality coke with greater thermal BTU yield over raw coal and dramatically reduced $SO_2$ emissions. The invention also permits conversion of fly-ash into commercial products whereas current practice calls for large capital investment in flue gas cleaning apparatus to capture and dispose of the millions of tons of fly ash generated annually by coal burning industrial and electric utility facilities. At the same time, much expensive conventional coal processing apparatus is eliminated by use of the present invention thus eliminating considerable capital and maintenance costs and further enhancing the economic viability of coal utilization. With coal processing costs minimized, economic output maximized, and environmental costs minimized, the attractiveness of coal as an economic resource will be greatly enhanced, to the benefit of the coal industry, the industries which use coal and other products of my process, and the consumer.

Of course, it will be understood that I have envisioned and contemplated various alternative and modified embodiments apart from the presently preferred embodiment disclosed hereinabove. Such alternative embodiments would also most surely occur to those versed in the art, once apprised of my invention. It is therefore my intention that the invention be construed broadly and limited only by the scope of the claims appended hereto.

I claim:

1. In a coal cleaning system for separating sulphur, minerals and ash from raw coal particles, the combination comprising:

a retort for processing a contained mixture comprised at least of raw coal and a medium consisting essentially of $H_2O$ for generating elevated temperature and pressure within said retort;

inlet means for receiving the coal and medium into said retort;

a receiving and storage facility for receiving the contained mixture from said retort;

conveying means communicating between said retort and said receiving and storage facility to provide a flow path for passing the contained mixture from said retort into said storage facility;

first and second control means associated with inlet means and said conveying means, respectively, to selectively isolate said contained mixture within said retort in a manner to permit selective establishment of elevated pressure at approximately 3000 to 5000 PSI therein;

heating means associated with said retort for heating the contained mixture to thereby subject the contained mixture to an elevated temperature of approximately 300° to 500° C. and a corresponding elevated pressure of approximately 3000 to 5000 PSI; and said second control means being operable while said contained mixture is subjected to such elevated pressure within said retort to rapidly open said flow path and thereby release such elevated pressure to said receiving and storage facility for fracturing the carbon matrix of the coal to release and separate sulphur, minerals and ash from the coal while simultaneously reducing the coal to small particles.

2. The combination as claimed in claim 1 wherein said receiving and storage facility additionally includes first and second outlet means for removing solid and gaseous substances therefrom, respectively.

3. The combination as claimed in claim 2 additionally including first separation means which communicates with said first outlet means and is operable to separate such solid substances into plural solid components.

4. The combination as claimed in claim 3 additionally including second separator means which communicates with said second outlet means and is operable to separate water from such gaseous substances.

5. The combination as claimed in claim 4 additionally including heating means cooperable with said receiving and storage facility to maintain an elevated temperature level therewithin.

6. In a coal cleaning system which is operable to separate sulphur, minerals and ash from raw coal to produce a substantially sulphur-free, de-ashed, de-mineralized coal product of substantially uniform particle size from raw ungraded coal, the improvement comprising:

means for modifying the structure of individual ungraded coal particles to produce therein a lattice-like network of interconnected interstices within the carbon matrix of the coal by heating the coal particles to approximately 300° to 500° C., and means for pressurizing said lattice-like network to approximately 3000 to 5000 PSI and for subsequently depressurizing to atmospheric pressure whereby a pressure differential is imposed between interior and exterior regions of each such coal particle to fracture the carbon matrix thereof and release and separate sulphur, minerals and ash therefrom while simultaneously reducing the coal to uniform particle size.

7. In the cleaning of raw, ungraded coal to separate sulphur, minerals and ash therefrom, the method comprising:
providing a mixture comprised at least of such coal and a pressure generating medium;
heating said mixture to a predetermined elevated temperature of approximately 300° to 500° C. and elevated pressure of approximately 3000 to 5000 PSI to internally pressurize individual coal particles;
rapidly depressurizing said mixture to create a pressure differential between interior and exterior regions of the coal particles; and
utilizing said pressure differential to fracture the carbon matrix of the coal particles for releasing and separating sulphur, minerals and ash from the coal while simultaneously reducing the coal to small particles.

8. The method as claimed in claim 7 including the additional step of maintaining the temperature of said depressurized mixture at a selected elevated temperature level less than said predetermined temperature and greater than ambient temperature to maintain separate gaseous and solid constituents of said mixture.

9. The method as claimed in claim 8 including the additional step, coincident with said maintaining temperature step, of separating a coal and mineral bearing solid constituent from said mixture.

10. The method as claimed in claim 9 including the additional step of separating said coal and mineral bearing solid constituent into plural solid components including a substantially mineral and ash-free coal component of substantially uniform particle size.

11. The method as claimed in claim 10 including the additional step of separating a given said gaseous constituent into plural components including a water component.

12. The method as claimed in claim 11 wherein said plural solid components further include an ash component.

13. The method as claimed in claim 12 including the additional step of oxidizing said ash component to produce slag, recycling at least some of the resultant heat of oxidation of said ash component for said heating of said mixture, and recycling at least some of said water component to provide a portion of said pressure generating medium for said mixture.

14. The method as claimed in claim 7 wherein said mixture is provided additionally with selected oxidation inhibiting agent means.

15. The method as claimed in claim 14 wherein said oxidation inhibiting agent means is selected from the group comprised of B-Naphthol, Fluorene and Iodobenzene.

16. The method as claimed in claim 7 wherein said mixture is provided additionally with selected de-sulphurizing agent means.

17. The method as claimed in claim 16 wherein said selected de-sulphurizing agent means is selected from the group comprised of calcium oxide, potassium hydroxide and sodium hydroxide.

18. The method as claimed in claim 8 wherein said selected elevated temperature level is in the range of about 100° C. to about 200° C.

19. The method as claimed in claim 18 wherein said selected elevated temperature level is about 150° C.

20. In a method for processing coal to separate sulphur, minerals and ash from the raw coal and to simultaneously reduce the coal particles to small particles, the improvement comprising:
fracturing the carbon matrix of the coal particles to release sulphur, minerals and ash by subjecting said raw coal to mechanical forces developed by heating the coal particles to approximately 300° to 500° C. and pressurizing the coal particles to approximately 3000 to 5000 PSI by means of a medium consisting essential of $H_2O$ followed by rapidly depressurizing the coal particles for releasing and separating sulphur, minerals and ash from the coal while simultaneously reducing the coal to small particles.

21. In a method for processing coal to separate sulphur, minerals and ash from the raw coal for further separate processing of the coal, sulphur, minerals and ash, the improvement comprising:
separating sulphur, minerals and ash from the raw coal by applying heat of approximately 300° to 500° C. and pressure of approximately 3000 to 5000 PSI by means of a medium consisting essentially of $H_2O$ to the raw coal in a manner to thereby fracture the carbon matrix upon depressurization of the raw coal to release sulphur, minerals and ash therefrom and mechanically separating such ash into multiple components including silica and alumina components while simultaneously reducing the coal to small particles.

22. The system as claimed in claim 1, wherein the contained mixture is heated to approximately 400° C.

23. The system as claimed in claim 1, wherein the contained mixture is pressurized to approximately 4000 PSI.

24. In a coal cleaning system for separating sulphur, minerals and ash from raw coal particles, the combination comprising:
a retort for processing a contained mixture comprised at least of raw coal and a medium consisting essentially of carbon dioxide for generating pressure within said retort;
inlet means for receiving the coal and medium into said retort;
a receiving and storage facility for receiving the contained mixture from said retort;
conveying means communicating between said retort and said receiving and storage facility to provide a flow path for passing the contained mixture from said retort into said storage facility;
first and second control means associated with inlet means and said conveying means, respectively, to selectively isolate said contained mixture within said retort in a manner to permit selective establishment of elevated pressure at approximately 3000 to 5000 PSI therein;
heating means associated with said retort for heating the contained mixture to thereby subject the contained mixture to an elevated temperature of approximately 300° to 500° C. and a corresponding elevated pressure of approximately 3000 to 5000 PSI; and
said second control means being operable while said contained mixture is subjected to such elevated pressure within said retort to rapidly open said flow path and thereby release such elevated pressure to said receiving and storage facility for fracturing the carbon matrix of the coal to release and separate sulphur, minerals and ash from the coal while simultaneously reducing the coal to small particles.

25. In the cleaning of raw, ungraded coal to separate sulphur, minerals and ash therefrom, the method comprising:

providing a mixture comprised at least of such coal and a pressure generating medium consisting essential of carbon dioxide;

heating said mixture to a predetermined elevated temperature of approximately 300° to 500° C. and elevated pressure of approximately 3000 to 5000 PSI to internally pressurize individual coal particles;

rapidly depressurizing said mixture to create a pressure differential between interior and exterior regions of the coal particles; and utilizing said pressure differential to fracture the carbon matrix of the coal particles for releasing and separating sulphur, minerals and ash from the coal while simultaneously reducing the coal to small particles.

* * * * *